W. H. SHANNON.
CORN CULTIVATOR ATTACHMENT.
APPLICATION FILED SEPT. 29, 1919.
1,338,594.
Patented Apr. 27, 1920.
2 SHEETS—SHEET 1.
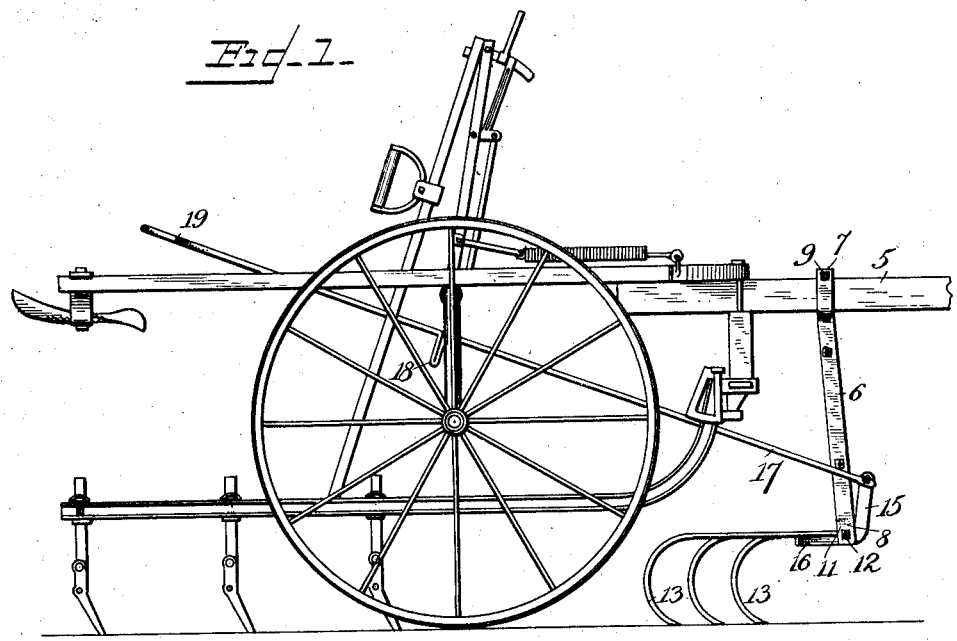
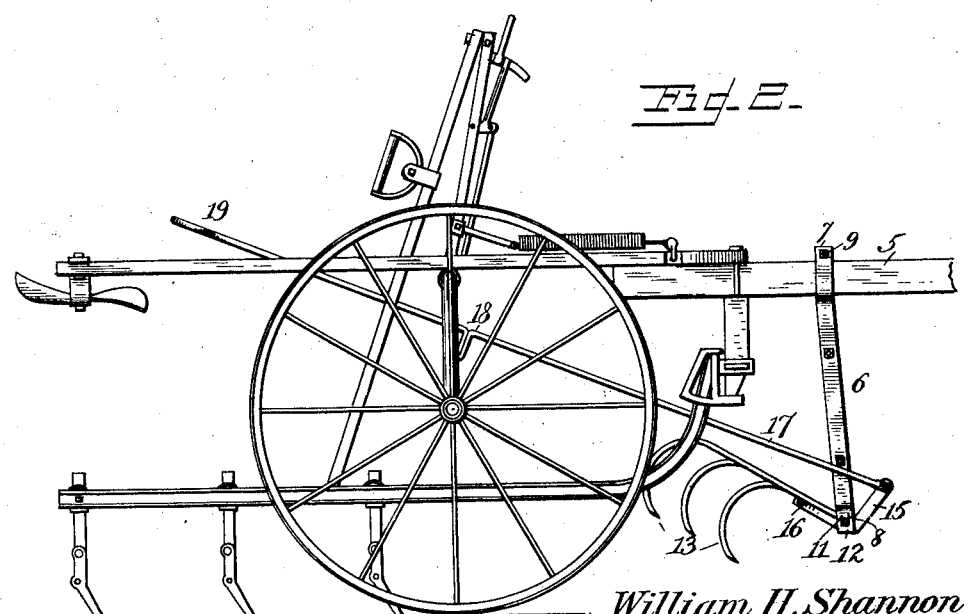
William H. Shannon
INVENTOR
WITNESSES
BY
ATTORNEY W. H. SHANNON.
CORN CULTIVATOR ATTACHMENT.
APPLICATION FILED SEPT. 29, 1919.
1,338,594.
Patented Apr. 27, 1920.
2 SHEETS—SHEET 2.
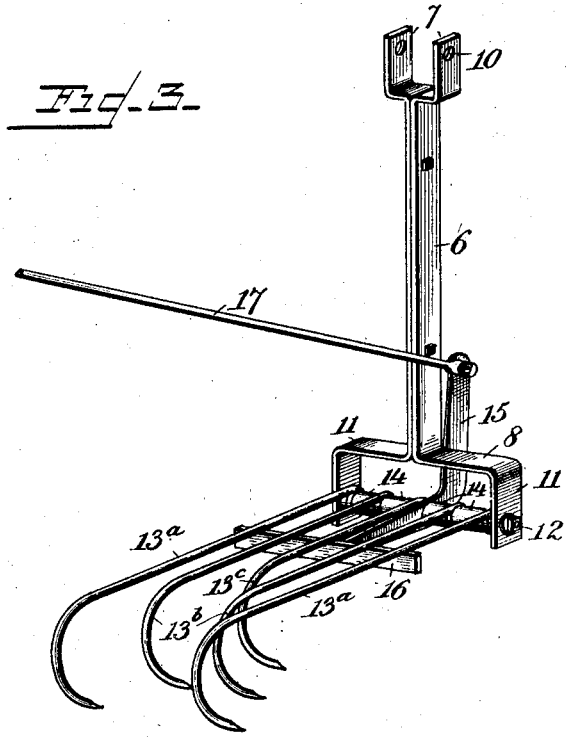
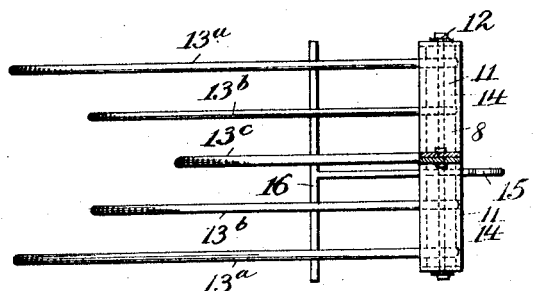
William H. Shannon
INVENTOR
WITNESSES
BY
ATTORNEY

UNITED STATES PATENT OFFICE.

WILLIAM H. SHANNON, OF ASTORIA, ILLINOIS.

CORN-CULTIVATOR ATTACHMENT.

1,338,594.     Specification of Letters Patent.     Patented Apr. 27, 1920.

Application filed September 29, 1919. Serial No. 327,043.

*To all whom it may concern:*

Be it known that I, WILLIAM H. SHANNON, a citizen of the United States, residing at Astoria, in the county of Fulton and State of Illinois, have invented a new and useful Improvement in Corn-Cultivator Attachments, of which the following is a specification.

This invention relates to attachments for cultivators.

It is the object of the invention to provide an attachment, which may be applied to any cultivator, to clear vines, weeds, stubble and trash out of the paths of the cultivator shovels and away from the growing corn.

Another object is to provide such an attachment which may be swung into inoperative position when desirable, as in turning corners or at the ends of rows.

In brief, the invention comprises a frame attached to the tongue of the cultivator, a plurality of hook-like teeth or tines pivoted on the frame so as to swing vertically independently of each other, and operating mechanism to raise all the tines together.

For an understanding of the invention, reference should be made to the drawing which accompanies and forms a part of this specification.

In the drawing—

Figure 1 is a side elevation of a standard form of cultivator with an embodiment of the invention in place;

Fig. 2 is a similar view, showing the attachment in raised or inoperative position;

Fig. 3 is a perspective view of the attachment detached; and

Fig. 4 is a plan view thereof.

The numeral 5 designates the tongue of a cultivator of any type on the market. The form of cultivator shown is only one of many to which the attachment is adaptable, and as the cultivator is of conventional construction, no description of it is attempted.

A standard 6 having a forked or bifurcated upper end 7 and a larger forked or bifurcated lower end 8 is secured to the tongue as by a bolt 9 threaded through holes 10 in the upper forked end and passing over the top of the tongue.

The wide forked lower end 8 of the standard includes two arms 11 having holes near their lower ends through which a long bolt 12 is passed. The bolt 12 carries a plurality of teeth or tines 13 which are preferably but not necessarily five in number, and include two outer long tines 13$^a$, two intermediate tines 13$^b$ and a short middle tine 13$^c$. Thus the ends of the tines outline the letter V, with the middle tine at the apex of the V, in advance of the others. All these are pivotally mounted on the bolt 12 as an axis, extending rearwardly therefrom to form a novel form of rake for the purpose specified. The tines are preferably formed of spring steel and thus have the desired resiliency to yield when buried rocks, roots and the like are encountered. Each tine is pivoted independently of the others so that it may be raised by obstructions without being subjected to great strains, and also that inequalities in the ground may not interfere with the raking action. The tines may have the curved form of hay fork tines, or may be otherwise fashioned.

Spacing collars 14 on the bolt 12 act to keep the tines apart, while permitting free vertical movement thereof. At the middle of the bolt, between the central tine and a spacing collar is pivoted a bell crank lever 15, the lower end of which has a T-head 16 underlying all the tines. The upper end of the lever is attached to an operating rod 17 having a return bend 18 intermediate its ends to permit hooking over any convenient fixed part of the cultivator frame. A loop handle 19 at the other end of the rod 17 allows the farmer seated on the cultivator to raise the rake by a pushing movement, or to lower the same by a pull.

The operation is as follows: The rake teeth are lowered to touch the ground but not to dig into it. The cultivator is worked as usual. The vines, such as morning-glory vines, honeysuckle, etc., which grow to profusion in many corn fields are caught by the tines and are stripped from the young corn, which passes freely under or between the resilient teeth without injury. Other troublesome pests such as weeds, trash and the like are gathered by the rake-like attachment and thus do not reach the blades or shovels of the cultivator. At intervals of the row, or at the end of the row, the farmer may lift the rake, dropping the collected matter in a pile, then make his turn, and then set the rake in operative position.

The great advantage of this invention is that it saves an immense amount of time and labor. The ordinary cultivator in a vine-infested field gathers up all the vines and weeds in sight and does not "bite" deeply enough into the soil as a consequence, unless the farmer stops at nearly every hill and pulls the vines loose with his hands. If he does this, most of his day goes without results; besides, pulling vines by hand frequently uproots the corn. By the present invention, the vines etc. are pulled loose from the corn and are combed out straight, being ordinarily left between the rows where they soon die. Thus one does not need to stop to clear the shovels and can get more work done, besides doing a better job of cultivating.

While the invention has been described in detail, I do not wish to be limited strictly to this disclosure, which is merely illustrative. I desire to modify the attachment in many particulars if it appear desirable. Thus, instead of five teeth, I may use seven or three, or any other number, and I may arrange them differently from what has been described. I desire to be limited only by the appended claims.

What is claimed is:—

1. In a cultivator attachment, a standard secured removably to the tongue of the cultivator and depending therefrom, a plurality of tines pivoted to the standard independently of each other, to form a rake set in advance of the cultivator shovels, whereby vines are stripped from plants, uprooted and laid in a row out of the paths of said shovels, and means for raising or lowering the tines.

2. In a cultivator attachment, a standard secured to the tongue of the cultivator in advance of the shovels, a plurality of tines pivoted independently to the standard so as to move vertically, said tines having different lengths so that some of the tines engage in advance of other tines, and manually operable means to raise or lower all the tines at once out of or into engagement with the ground.

3. In a cultivator attachment, a standard secured to the cultivator in advance of the shovels, a plurality of resilient curved tines pivoted to the standard independently, said tines being arranged so that their ends form the letter V with the middle tine or tines in advance of the others whereby the attachment acts like a comb, and means for raising or lowering the tines.

4. In a cultivator attachment, a standard, and means for securing the standard to the tongue of the cultivator in advance of the shovels, said standard having a forked lower end, a series of tines pivoted to the forked lower end of the standard so as to work independently of each other, collars for spacing the front ends of the tines from each other where they are connected to the standard, a lever mounted on the pivot of the tines and having one arm arranged below the same, and operating means connected to the other arm of said lever so as to permit the raising of all the tines from the ground.

In testimony that I claim the foregoing as my own, I have hereto affixed my signature in the presence of two witnesses.

WILLIAM H. SHANNON.

Witnesses:
 Jos. H. GRUBER,
 JOHN SKINNER.